United States Patent
Commons

(10) Patent No.: US 7,689,666 B2
(45) Date of Patent: Mar. 30, 2010

(54) SYSTEM AND METHOD FOR RESTRICTING INTERNET ACCESS OF A COMPUTER

(76) Inventor: Richard Commons, 615 Broadway N. 18, Amityville, NY (US) 11701

( * ) Notice: Subject to any disclaimer, the term of this patent is extended or adjusted under 35 U.S.C. 154(b) by 251 days.

(21) Appl. No.: 11/895,891

(22) Filed: Aug. 28, 2007

(65) Prior Publication Data

US 2008/0059634 A1     Mar. 6, 2008

Related U.S. Application Data

(60) Provisional application No. 60/841,525, filed on Aug. 31, 2006.

(51) Int. Cl.
*G06F 15/16*     (2006.01)

(52) U.S. Cl. .................. 709/217; 709/225; 709/219; 709/218; 707/1; 707/9; 707/104.1

(58) Field of Classification Search ................ 709/217, 709/219, 218, 225; 707/1, 9, 104.1
See application file for complete search history.

(56) References Cited

U.S. PATENT DOCUMENTS

| | | | |
|---|---|---|---|
| 5,717,913 A | 2/1998 | Driscoll | 707/5 |
| 5,761,683 A | 6/1998 | Logan et al. | 715/206 |
| 5,781,909 A | 7/1998 | Logan et al. | 707/200 |
| 5,787,254 A | 7/1998 | Maddalozzo, Jr. et al. | 709/228 |
| 5,802,299 A | 9/1998 | Logan et al. | 709/218 |
| 5,802,518 A | 9/1998 | Karaev et al. | 707/9 |
| 5,826,267 A | 10/1998 | McMillan | 707/9 |
| 5,920,859 A | 7/1999 | Li | 707/5 |
| 5,933,832 A | 8/1999 | Suzuoka et al. | 707/101 |
| 5,953,732 A | 9/1999 | Meske, Jr. et al. | 715/239 |
| 5,978,828 A | 11/1999 | Greer et al. | 709/224 |
| 6,037,934 A | 3/2000 | Himmel et al. | 715/760 |
| 6,105,027 A | 8/2000 | Schneider et al. | 707/9 |
| 6,112,202 A | 8/2000 | Kleinberg | 707/5 |
| 6,139,177 A | 10/2000 | Venkatraman et al. | 700/83 |
| 6,145,000 A | 11/2000 | Stuckman et al. | 709/219 |
| 6,208,995 B1 | 3/2001 | Himmel et al. | 707/104.1 |
| 6,211,871 B1 | 4/2001 | Himmel et al. | 715/744 |
| 6,408,336 B1 | 6/2002 | Schneider et al. | 709/229 |
| 6,539,430 B1 * | 3/2003 | Humes | 709/225 |
| 6,772,214 B1 | 8/2004 | McClain et al. | 709/229 |
| 6,785,728 B1 | 8/2004 | Schneider et al. | 709/229 |

(Continued)

*Primary Examiner*—Dohm Chankong
(74) *Attorney, Agent, or Firm*—Gerald T. Bodner

(57) ABSTRACT

A system for selectively allowing and restricting access to websites requested by a user includes a computer having a central processing unit, a display, a keyboard and a web browser installed on the central processing unit. The web browser has a list of allowable top level domains (TLDs), and the central processing unit includes a database having a list of allowable uniform resource locators (URLs). The web browser compares the TLD and URL associated with a requested website to respectively determine if they are the same as a TLD or URL in the lists of allowable TLDs and URLs. If either the TLD or URL associated with the requested website is the same as a TLD or URL on the lists, the user is allowed to access the requested website on the computer. If neither the TLD nor the URL associated with the requested website is the same as a TLD or URL on the lists of allowable TLDs and URLs, the user is denied access to the requested website on the computer.

6 Claims, 3 Drawing Sheets

U.S. PATENT DOCUMENTS

| | | | |
|---|---|---|---|
| 6,928,455 B2 * | 8/2005 | Dougu et al. | 707/104.1 |
| 6,934,753 B2 * | 8/2005 | Kim | 709/225 |
| 2002/0073233 A1 * | 6/2002 | Gross et al. | 709/245 |
| 2004/0006621 A1 * | 1/2004 | Bellinson et al. | 709/225 |
| 2004/0103122 A1 * | 5/2004 | Irving et al. | 707/200 |
| 2004/0267929 A1 * | 12/2004 | Xie | 709/225 |
| 2005/0060565 A1 * | 3/2005 | Chebolu et al. | 713/200 |
| 2006/0277462 A1 * | 12/2006 | Umbreit | 715/513 |
| 2007/0005652 A1 * | 1/2007 | Choi et al. | 707/104.1 |

* cited by examiner

SYSTEM AND METHOD FOR RESTRICTING INTERNET ACCESS OF A COMPUTER

CROSS REFERENCE TO RELATED APPLICATION

This application is related to U.S. Provisional Application Ser. No. 60/841,525, filed on Aug. 31, 2006, and entitled "Browser Program and Method for Restricting Internet Access of a Computer", the disclosure of which is incorporated herein by reference and on which priority is hereby claimed.

BACKGROUND OF THE INVENTION

1. Field of the Invention

This invention relates to Internet browser software and methods of restricting Internet access of a computer, and more specifically relates to restricting Internet access of a public or semi-public computer.

2. Description of the Prior Art

The Internet is a large computer network. The World Wide Web (WWW) was designed to allow a computer user, using a client program, to view files located on server computers throughout the Internet.

A file is accessed through the computer user's Internet connection and returned thereto and displayed on the web browser thereof. A WWW HTML (hyper-text mark-up language) document is normally viewed by selecting a file located on a server computer that is accessed by requesting the address of the file, the Uniform Resource Locator (URL).

A URL is usually accessed by entering a group of characters in an appropriate field in a web browser. The URL request is processed by the web browser and the file is located on the Internet utilizing IP. Frequently accessed web pages, however, may be assigned to an icon or to a list contained within the web browser.

Files written in Hyper Text Mark-Up language are known as Hypertext documents and viewing these files is accomplished using the web browser. Hypertext links are another method of finding an appropriate file for viewing. Web pages in HTML allow a user viewing a web page to "click" on certain text or on a certain image and thereby request the underlying URL of another web page.

The Internet is organized so that every computer thereon has its own identifying numerical address. Transmission Control Protocol and Internet Protocol (TCP/IP) allow computers on the Internet to communicate with, and to find correct locations of, each other. The numerical address of each computer is referred to as the IP address. The URL consists of a protocol, a domain name associated with an IP address, and a file name.

The system whereby a name is assigned to the computer number is the Domain Name System. Names are used as a mnemonic alternative to a numerical IP address. A Domain Name consists of a number of elements designed to correspond to an IP address. The elements of a Domain Name consist of a top level domain and may include second, third, and fourth level domains. By knowing the correct domain name a computer may gain access to any computer located on the WWW.

Organizations that are by necessity obligated to provide computers in public areas often find that the open nature of the Internet allows an individual to use the computer to access material that is not consistent with the organization's goals. Access restriction is therefore required and may be accomplished by a variety of methods.

One such method is to establish a tabular listing of acceptable URLs. The selection of websites is then accomplished by selecting from a list of hypertext links. This method requires maintaining a current list of the desired websites for the user's access.

Another approach is to provide access permission based on a user authorization level and rating the contents of individual websites. This approach necessitates assigning an authorization level based on parameters that an individual may choose not to divulge. Also, web page ratings must be continually reviewed to remain current. Both aspects, assigning an authorization level and assigning a rating to individual web pages may require resources that are not available to a given organization. Additionally, this approach necessitates that the organization responsible respond to changes in a user's authority level in a timely manner to prevent inappropriate restriction to an acceptable website.

Filtering services are offered as another approach to limiting access to information found on the WWW. Generally directed towards filtering pornography and violence, these services normally charge a monthly fee. A filtering service may apply its standards to any given website.

Problems associated with the above methods of limiting access are that a large amount of resources are required to start and maintain the number of websites allowed to a given user. Another is that due to the changing nature of the Internet, new websites are being added all the time and they must be subjected to review on a continual basis.

Numerous innovations for Internet information systems have been provided in the prior art that will be described infra. Even though these innovations may be suitable for the specific individual purposes to which they address, however, they differ from the present invention.

U.S. Pat. No. 5,717,913 discloses an Information Filtering (IF) system for retrieving relevant text data from a data base document collection. A user can use this system to access a dynamic data stream to retrieve relevant data such as accessing e-mail or a wire-service. Alternatively, a user can use the IF system to access a data storage archive such as electronically stored patents, journals and the like. The invention includes several steps. The first step has a user reduce the information they are interested in into a tangible form such as manually writing a natural language user need statement, or alternatively inputting the statement electronically into a computer file for storage. The next step is to create a filter window having an adjustable document viewing text length that will be used to electronically scan through the database collection of documents in order to determine a relevancy value for each scanned document. The filter can be created several ways using synonym and domain lists. Alternatively, the synonym and lists for each document can be determined by Entity-Relationship (ER) modeling to generate a search schema. After documents receive relevancy values, the user is free to view only those documents having relevancy values that exceed a pre-selected threshold value. Documents can be ranked from most relevant to least relevant. Feedback information from viewing the retrieved documents can be used to update the synonym/domain lists of the filtering window to enhance the relevance retrieval of subsequent documents.

U.S. Pat. No. 5,787,254 discloses a browser extension method and system for a Web browser in a computer network having a client connectable to one or more servers, the client having an interface for displaying a first hypertext document with one or more hypertext links to a second hypertext document located at a server. Initially, an access parameter indicating a selected parameter which describes an access to another hypertext document is associated with a hypertext link. Thereafter, the hypertext link to the second hypertext document is selected in response to user input. Next, an access time period is initiated, during which the hypertext link accesses the second hypertext document, in response to the selection of the hypertext document. Thereafter, the access parameter is displayed in response to initiating the access time period, permitting a user to review the access parameter.

U.S. Pat. No. 5,802,518 discloses a secure electronic distribution of research documents over the World Wide Web to investors who are authorized to receive the research documents. A repository server receives research documents from contributors. Also received are corresponding document profiles with information relating to each research document including authorization information specifying who is permitted to access each research document. The repository server includes a first database for structured query searches and a second database for full text searches. A web server is coupled to the repository server and coupled to the World Wide Web. The web server receives requests from investors for research documents that satisfy a query. The web server determines whether the first database or the second database should be searched based upon the type of query. The repository server transmits to the web server a list of research documents that satisfy the query and which the investor is authorized to access according to the authorization information. The web server formats the list of documents according to a template form. Optionally, queries can be optimized. The system has a control mechanism to prevent concurrent unauthorized access by two people using the same ID/password combination.

U.S. Pat. No. 5,920,859 discloses a search engine for retrieving documents pertinent to a query indexes documents in accordance with hyperlinks pointing to those documents. The indexer traverses the hypertext database and finds hypertext information including the address of the document the hyperlinks point to and the anchor text of each hyperlink. The information is stored in an inverted index file, which may also be used to calculate document link vectors for each hyperlink pointing to a particular document. When a query is entered, the search engine finds all document vectors for documents having the query terms in their anchor text. A query vector is also calculated, and the dot product of the query vector and each document link vector is calculated. The dot products relating to a particular document are summed to determine the relevance ranking for each document.

U.S. Pat. No. 5,933,832 discloses a retrieval system for performing database retrieval in response to a retrieval request that includes a database preparing means for collecting corresponding data to prepare a database under at least a condition that an update frequency range of data serving as a target for index table generation is uniquely assigned to the database, and an update frequency of data falls within the assigned update frequency range, or a mean update frequency of a data group to which the data belongs falls within the assigned update frequency range.

U.S. Pat. No. 5,953,732 discloses a computer-implemented method and system for retrieving information. A first file of information is received which includes a first markup language to identify contents of the information. Responsive to receiving the first file of information, the first file of information is parsed to generate a list of profiles, and at least one corresponding topic for each of the list of profiles. A second file in a second markup language is created containing the list of the profiles and at least one corresponding third file is created in a third markup language for the at least one corresponding topic for each of the list of profiles. The second file contains anchors referencing each at least one corresponding third file, and first markup instances in the first file of information are converted to second markup instances in either the second file or the third file. The first file of information is parsed to determine the at least one article, if any, for each of the at least one corresponding top for the each of the list of profiles, and a corresponding brief for the at least one article. A fourth file and a fifth file are generated for the at least one article, if any, for each of the at least one corresponding topic for each of the list of profiles. The fourth file includes a brief of each of the at least one article in the first file of information and an anchor to the fifth file, the fifth file including text for the at least one article, if any, for each of the at least one corresponding topic for each of the list of profiles. In implemented embodiments, a sixth file can also be created which contains a plurality of anchors referencing a plurality of the fifth files, where in the anchors in the sixth file are arranged by each of the profile and corresponding topic. The first file of information can include receiving an electronic mail (e-mail) message.

U.S. Pat. No. 5,978,828 discloses an apparatus and method of providing notification of a content change of a web page. The method includes the steps of transmitting a request from a first electronic system to a second electronic system for a quotient value indicative of the content change, transmitting the quotient value from the second electronic system to the first electronic system, comparing the quotient value to a predetermined value to determine whether a threshold is triggered, and notifying the first electronic system of the content change if the threshold is triggered.

U.S. Pat. No. 6,112,202 discloses a system and method for searching for desired items from a network of information resources. In particular, the system and method have advantageous applicability to searching for World Wide Web pages having desired content. An initial set of pages are selected, preferably by running a conventional keyword-based query, and then further selecting pages pointing to, or pointed to from, the pages found by the keyword-based query. Alternatively, the invention may be applied to a single page, where the initial set includes pages pointed to by the single page and pages which point to the single page. Then, iteratively, authoritativeness values are computed for the pages of the initial set, based on the number of links to and from the pages. One or more communities, or "neighborhoods," of related pages are defined based on the authoritativeness values thus produced. Such communities of pages are likely to be of particular interest and value to the user who is interested in the keyword-based query or the single page.

U.S. Pat. No. 6,139,177 discloses web access functionality embedded in a device that includes modules for generating a device web page wherein the device web page enables selection of at least one control function for the device. The web access functionality also includes modules for accessing the device web page via a communication path such that a user of a web browser accesses the control function for the device through the device web page. The control function includes control functions for loading new information into the device via the communication path and control functions for providing notification messages via the communication path upon the occurrence of events in the device.

U.S. Pat. No. 6,145,000 discloses a method and system for creating and navigating linear hypermedia resource programs. The system includes a distributed hypermedia resource network having a plurality of hypermedia resources residing on one or more remote information nodes. A common remote information node is in communication with a subscriber station and the remote information nodes in the distributed network. The common remote information node contains at least one linear hypermedia resource program consisting of pre-selected media elements from one or more hypermedia resources linked with exclusive linear links, each media element in the linear program having only one forward link to the next media element. The method includes the steps of downloading and displaying a media element in the linear program and responding to user commands to download and display the next media element in the linear program.

It is apparent that numerous innovations for Internet information systems have been provided in the prior art that are adapted to be used. Furthermore, even though these innovations may be suitable for the specific individual purposes to which they address, however, they would not be suitable for the purposes of the present invention as heretofore will be described.

OBJECTS AND SUMMARY OF THE INVENTION

Accordingly, an object of the present invention is to provide a system and method for accessing servers of acceptable domains and acceptable URLs by a computer of a user on the Internet that avoids the disadvantages of the prior art.

Another object of the present invention is to provide a system and method for accessing servers of acceptable domains and acceptable URLs by a computer of a user on the Internet that is simple to use.

Another object of the present invention is to provide a system and method for accessing servers of acceptable domains and acceptable URLs by a computer of a user on the Internet.

The system includes a computer and a web browser installed thereon and configured to have contained therewithin one or both of a list of one or more acceptable domains and a database listing at least one of the acceptable URLs. The web browser has a requested URL enterable therein by the user, either directly or by way of a homepage thereof, and once entered, determines if the requested URL is in the list of the acceptable domains, and if so, accesses the server associated with the requested URL, and if not, determines if the requested URL is listed in the database, and if so, accesses the server associated with the requested URL, and if not, displays on the computer of the user a "requested URL is not accessible" message.

These and other objects, features and advantages of the present invention will be apparent from the following detailed description of illustrative embodiments thereof, which is to be read in connection with the accompanying drawings.

DETAILED DESCRIPTION OF THE PREFERRED EMBODIMENTS

Figure 1:
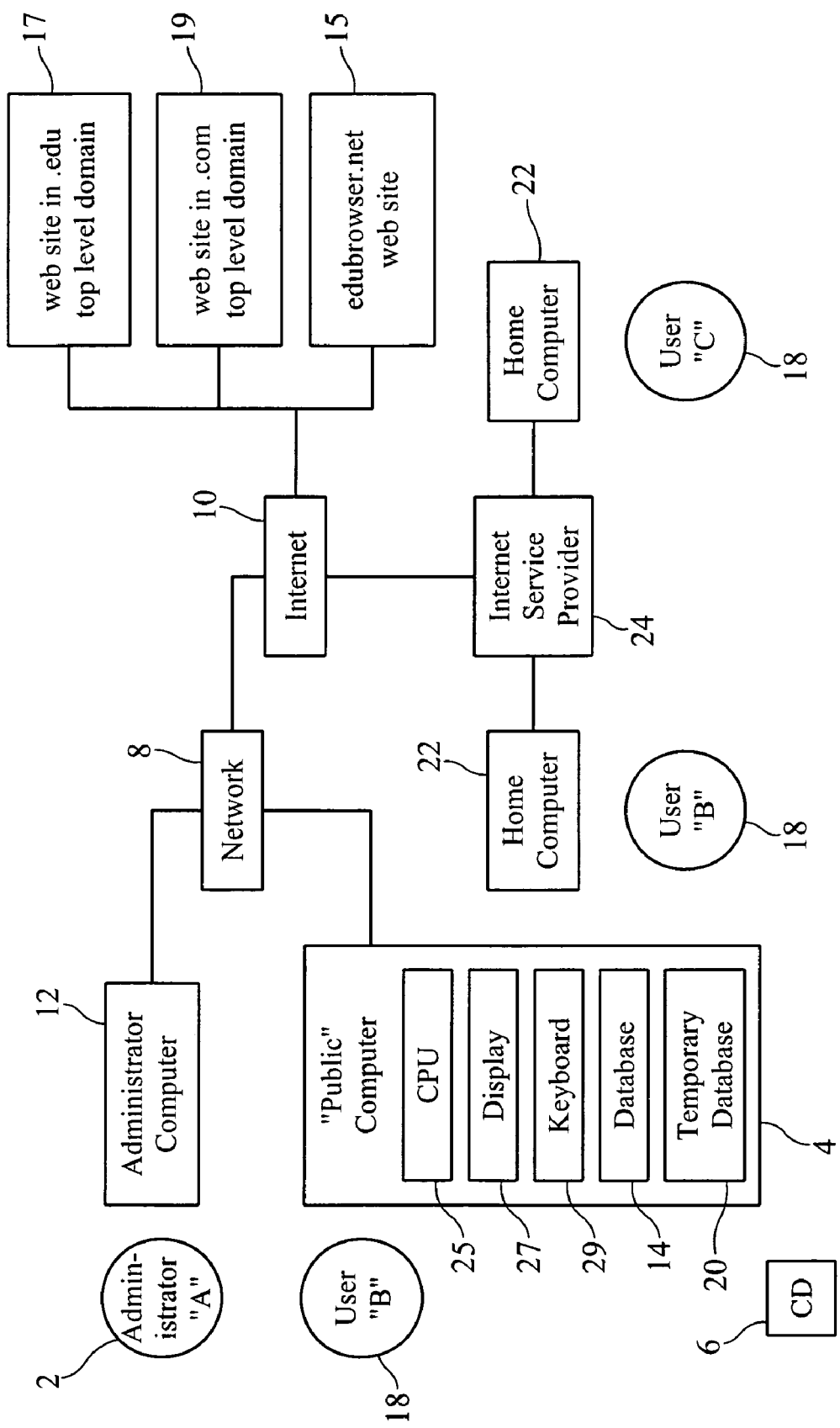
FIG. 1 is a block diagram of the procedure for installing the system of the present invention.
Figure 2:
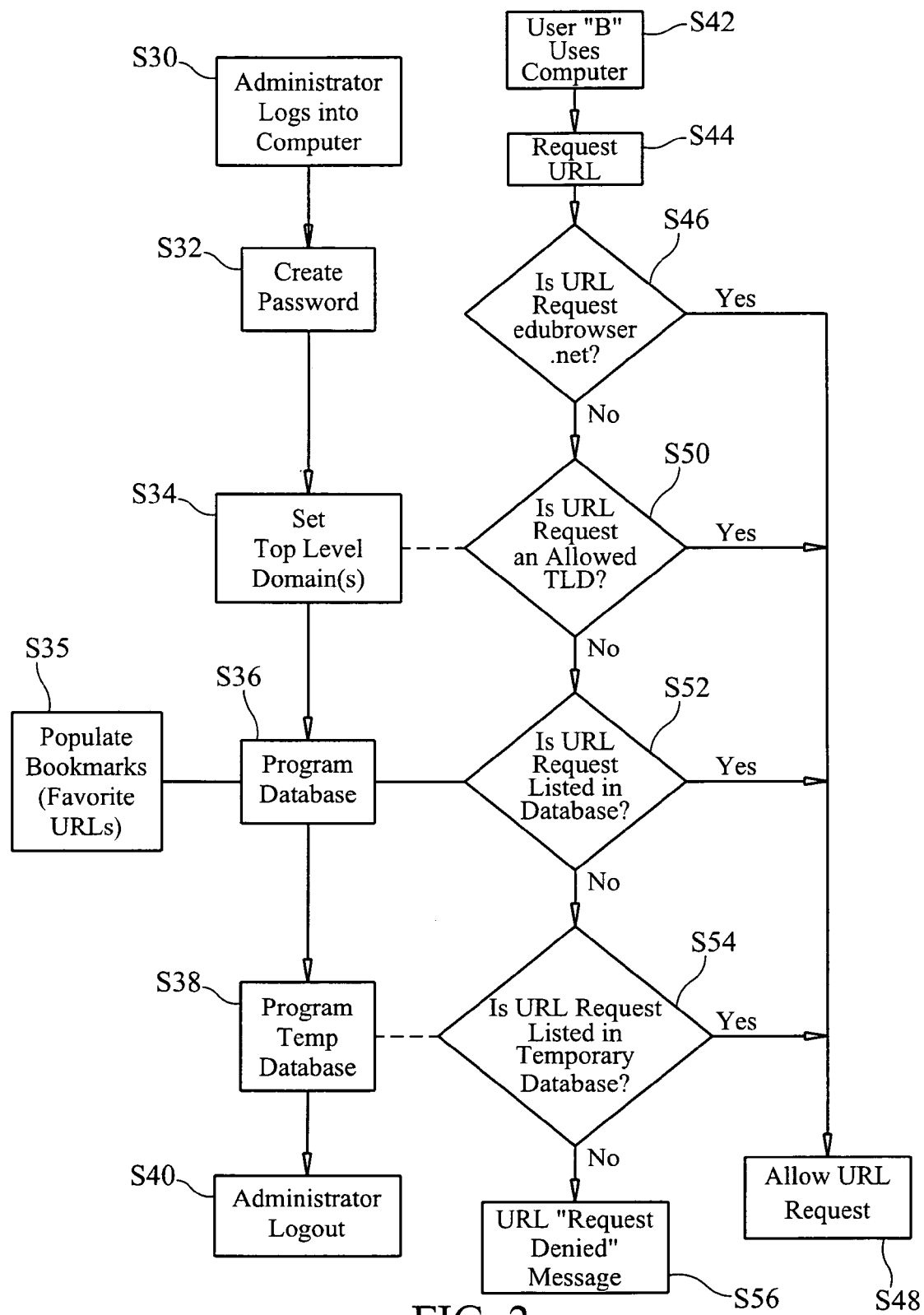
FIG. 2 is a flow chart of the method of the present invention.
Figure 3:
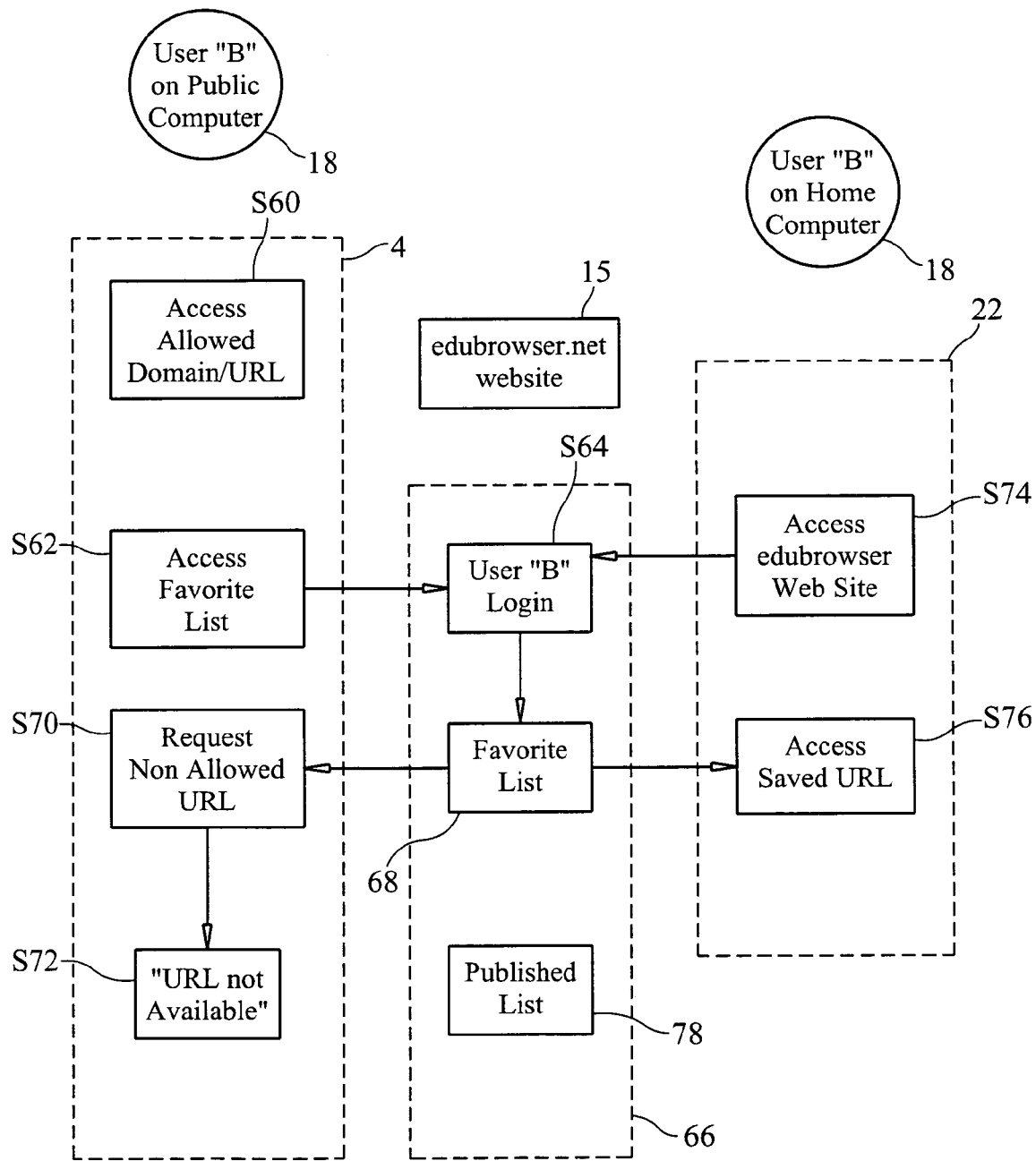
FIG. 3 is a block diagram of the system of the present invention being used by a user.

In accordance with one form of the present invention, and referring to FIGS. 1-3 of the drawings, it will be seen that a computer administrator (Administrator "A") 2 who wishes to restrict the Internet access of a public or semi-public computer 4 may do so by installing the program of the present invention on the restricted-access computer 4. He (the administrator 2) can access the computer 4 by operating it directly and installing the browser program using a media such as a compact disc (CD) 6, or he can download the browser program through a network connection 8 or an Internet connection 10. Alternatively, the administrator 2 can access the computer 4 remotely through his network 8 from his own computer 12, as illustrated by FIG. 1, to download the browser program on the computer 4.

Once the browser program of the present invention has been installed on the restricted-access computer 4, it is then configured by the administrator 2. Initially, the administrator 2 assigns a password to the configuration mode to make the program more secure. If desired, the allowed "Top Level Domains" (TLDs) are then programmed into the computer 4. The program may default to a specific allowed top level domain, such as ".net", or the administrator may have a choice of a number of TLDs (for example, .edu 17, .gov, .org).

Also, if desired, a database 14 (see FIG. 1) of allowed individual Uniform Resource Locators (URLs) is then programmed. The URLs are typically from outside the allowed top level domains (for example, .com 19). The database 14 may be programmed manually by the administrator 2, or a preexisting list may be downloaded through the network 8 or the Internet 10 from the administrator's computer 12 or from a remote site where the list is stored, such as "www.edubrowser.net" 15. Normally, the bookmark (referred to as "favorites" in Microsoft's Internet Explorer™ program) links 16 available to the user are populated concurrently with the database 14. However it is possible to edit the database 14 directly without a bookmark 16 appearing on the browser.

Additionally, the administrator 2 may make use of lists compiled by others that are available on the Internet 10 or network 8. The administrator 2 will enter a URL address of a list that he wishes to import, and associate that with a name for the list. The names of the lists will appear in a menu on the restricted-access computer 4 that is accessible to the user 18. When the name of the list is selected by the user 18, that list will be downloaded to a temporary database 20 situated on the restricted-access computer 4 or at a remote site, such as at www.edubrowser.net 15, and enable the URLs within the list to be accessed.

At this point, the administrator 2 may log out of the computer 4, and the computer 4 may be left available to users 18. When a user 18 requests a URL on the computer 4, the browser program of the present invention will process the request, subject to the rules of the browser program and the programming the administrator 2 has done. First, if the URL requested is "edubrowser.net" (i.e., a preferred domain name) or some other remote website specifically designated by the web browser, the request will be allowed. Secondly, if the request is within a programmed top level domain (TLD), the request will be allowed. If not, then if the request is for a URL listed in the database 14 or the temporary database 20, the request will also be allowed. If the requested URL is outside any of the parameters of the browser program, a "requested URL denied" message or the like will appear to the user 18 on the computer's display 27 (see FIG. 2 of the drawings).

The preferred remote website "edubrowser.net" 15 or another designated website allows a user 18 to save a list of favorite or frequently accessed URLs. The user 18 may access the edubrowser.net website 15 by clicking on an icon when using the browser program of the present invention. The user 18 creates a login user name and password, and then may save a link to the desired website. Clicking on a link within the website 15 is subject to the rules of the local browser as programmed by the administrator 2.

When the user 18 subsequently moves to another computer 22 that has a normal web browser installed, the user 18 may again access the edubrowser.net website 15. The user 18 may login and access any of the previously saved URL links on the edubrowser.net website 15 and also save additional URL links at the website 15.

An administrator 2 may also access the edubrowser.net website 15 or another designated website and create and save a list of URLs that he may import to the browser program on the restricted-access computer 4 at some point in the future. To do so, the list is saved as a file, as opposed to an HTML document. The file on the edubrowser.net website 15 may be accessed through the Internet 10 and downloaded to the browser program of the present invention on the public or semi-public computer 4.

The present invention is used when it is desired to restrict the Internet access of a public, or semi-public, computer 4. In one-suitable application of the present invention, in an educational setting or environment, a computer 4 will be placed in a high school, and the application of the browser program thereon will now be described below in greater detail. A school administrator 2 or other person will configure the computer 4, and it will be used by students in a classroom setting. The students will go home and access information they have stored on the Internet 10 at a remote site, for example, at www.edubrowser.net 15.

The following is an example of a specific application of the present invention relating to its use on public or semi-public computers 4 in an educational setting, although it should be realized that the present invention is not limited to such an application and is suitable for use in limiting access to computers in other environments, such as in a public library.

The browser program of the present invention allows access to certain TLDs and URLs over the Internet 10 in accordance with specific rules of the browser and in accordance with the method of the present invention, some of which rules are programmable by the administrator 2. The first rule, which is not programmable, is if the URL request from the user 18 using the web browser of the present invention is for a certain website, for example, www.edubrowser.net 15, then the request is allowed and the browser accesses the website. The second rule is that a URL request is checked for a specific top level domain (TLD). If the top level domain (TLD) of the requested website matches an allowed top level domain, the request is allowed. Thirdly, if a URL request matches a URL in a programmable database 14, the request is allowed. The browser program in the example above is preferably already partially configured to only allow URL requests that are part of the .edu top level domain 17.

To install the program, the administrator goes to the classroom computer 4 and loads the browser program onto the machine by loading it from a CD 6 or other media. Alternatively, the administrator 2 could download the browser program over the network 8 or the Internet 10 where it is found on a remote site, such as at www.edubrowser.net 15. Another alternative for the administrator 2 would be to access the classroom computer 4 via the network 8 and install and configure the browser program remotely using the administrator computer 12.

Once the browser program has been installed on the classroom computer 4, the administrator 2 makes the program more secure by adding a password to the configuration mode. Proceeding with the configuration of the browser program on the classroom computer 4, the administrator 2 programs the local database 14 with a listing of URLs that will be allowed (for example, ".com", ".net", ".org") in addition to the URLs from the top level domain "edu" 17. The configuration of the database 14 in the classroom computer 4 may be accomplished in a similar manner to installing the browser program. The database 14 may be populated locally, downloaded from a network 8 or Internet 10 location, or remotely through the administrator's computer 12. The basic configuration of the classroom computer 4 is now complete, and the administrator 2 may log out.

The bookmarks 16 of the browser program are normally populated concurrently with the programming of the database 14. Therefore, a student 18 may click on a bookmark link 16 and access a URL programmed in the database 14. The configuration of the browser program on the classroom computer 4, in its current state, allows a user student 18 to access domains conforming to the programmed rules.

The purpose of applicant's edubrowser.net website 15 is to store a listing of frequently accessed URLs. This is accomplished by a user 18 accessing the edubrowser.net website 15 and creating a login with a user name and password combination. Once the user 18 has logged in at the edubrowser.net website 15, he accesses a page that allows him to add a URL link, the name of the link and organize the links in a "folder" arrangement. Clicking on any link on the list requests that URL on that web browser.

After the configuration of the computer 4 is complete, a student 18 may use the computer 4 during the class. On this computer 4, the student 18 may request and access any URL in the .edu domain, any URL programmed into the database 14, and the edubrowser.net website 15. Once the student 18 has accessed a URL that he would like to reference later, it would be desirable to create a link to that URL. To do so, the student 18 clicks on an icon on the browser program of the present invention which brings him to the edubrowser.net website 15. Upon logging in to the site 15, the student 18 then creates a link to the desired URL.

When the student 18 leaves school and returns home, he may be using a web browser on his home computer 22 that will access all available URLs, and not be subject to the rules of the browser program loaded on the classroom computer 4. The student 18 may access edubrowser.net, login to the list of saved URL links and click on a link previously created. This allows him to refer to a web page that was relevant to his class work while he is at home.

While he is at home, a student 18 may access a website that he has an interest in, either relating to school or not, and not be subject to the rules of the browser program on the classroom computer 4, as stated previously. At that time, the student 18 could log into the edubrowser.net website 15 and create a link for later reference.

It is also possible that a parent may wish to install the browser program of the present invention on his home computer 22 for his child's use. The installation of the program would be similar to the installation of the browser program loaded on the classroom computer 4, described previously, as well as the usage.

Upon his return to the classroom, the student 18 may access previously saved web pages by clicking on a link through the edubrowser.net website 15. However, clicking on any link will be subject to the rules of the web browser that were previously programmed for the classroom computer 4.

Further programming of the browser is also possible. Because the edubrowser.net website 15 can be used independently of the browser loaded on the classroom computer 4, anyone can take advantage of the ability to save a list of favorite URLs on the website 15. This would include teachers and administrators 2. In the case that an administrator 2 would like to save a list of URLs for programming the database 14, the preferred procedure would be for him to save the listing to a location that would allow him to access the list from the browser. If a desired list were moved to a location, such as edubrowser.net/publish/admin_user_name.html, it could be downloaded from that location.

To take advantage of this ability with the web browser of the present invention, an administrator 2 could have a number of locations from which he would like to download a list of URLs. The administrator 2 would then program a listing of these locations and a corresponding name into a menu of names. Selecting a name from the menu would initiate a download of the listing to a database 14 in the computer 4 on which the browser is installed.

FIG. 1 shows the components of the system of the present invention and illustrates the method of installing the browser program of the present invention, and further illustrates how a user would use a restricted-access computer (i.e., public or semi-public computer 4) having the browser program of the present invention loaded thereon. The system includes one or more restricted-access computers 4, each of which basically includes a central processing unit (CPU) 25, a display 27 operatively coupled to the CPU 25 for displaying messages and other information thereon, and a keyboard 29 operatively coupled to the CPU 25 for the user to enter the requested URL on the computer 4. The system further includes the browser program installed on the computer 4.

More specifically, the administrator "A" 2 may install the browser program on the public or semi-public computer 4 by 1) physically going to the computer 4 and loading a compact disc (CD) 6 or other media containing the browser program onto the computer 4; 2) downloading the browser program over a network 8 or the Internet 10 from a remote website, such as edubrowser.net 15; and 3) accessing the public or semi-public computer 4 through the network 8 from the administrator's computer 12 and downloading the browser program that way.

If parents or students (shown for illustrative purposes collectively in FIG. 1 as user "B" and user "C" 18) wishes to install the browser program of the present invention on their home computers 22, they can do so through their internet service provider 24 or using any one of the three methods described above.

FIG. 2 illustrates the method of installing the browser program of the present invention on a restricted access computer 4, and the method by which a user 18 accesses a site by using the restricted access computer 4 and the browser program of the present invention loaded thereon. The administrator 2 logs onto the restricted access computer 4 (Step S30) and creates an administrator password (Step S32) for the administrator only. At this stage, just the basic web browser program, with certain rules, is installed on the computer 4. Now, the administrator 2 further programs the browser by selecting the top level domains (TLDs) that are to be made available to a user 18 of the restricted access computer 4 (Step S34). Such TLDs may include, for example, the well-known ".edu" and ".net" domains. Alternatively, the administrator 2 may decide not to select a top level domain, and rely solely on specifically designated URLs.

The administrator 2 will now add certain selected URLs to the database 14 (Step S36). Normally, this procedure also concurrently populates the Bookmark list (Step S35); however, the database 14 can be edited separately from the Bookmark list, if desired.

In the installation procedure for the browser, the administrator 2 may now program certain selected URLs into a temporary database 20, such as may be located on the public or semi-public computer 4 or at a remote site, such as at www.edubrowser.net 15 (Step S38), if it is desired to do so. Such URLs may be related to homework assignments, current events or other interesting websites that are timely in nature. The administrator 2 may post these URLs in the temporary database 20 for a desired period of time, for example, one week. After this, installation of the web browser of the present invention on the public or semi-public computer 4 is now complete, and the administrator 2 logs out of the computer 4 (Step S40).

FIG. 2 also illustrates how the web browser of the present invention, installed on the public or semi-public computer 4, is used by a user "B" 18 to access a desired website on the computer 4 (Step S42). First, user "B" 18 requests a desired URL using the computer 4 (Step S44). The browser of the present invention first decides whether the requested URL relates to the pre-programmed website, such as www.edubrowser.net 15 (Step S46). At this remote site, the user 18 or administrator 2 may store his or her list of URLs. If the requested URL is the pre-programmed website, then the browser program of the present invention will allow the user 18 to access the requested URL on the public or semi-public computer 4 (Step S48). If the requested URL is not the preprogrammed allowed URL, then the browser program determines whether the requested URL is the same as a TLD on a list of allowable top level domains (TLDs) programmed into the browser (Step S50). If the requested URL is one of the allowable TLDs, the browser program will allow access to the requested URL on the computer 4 (Step S48). However, if the URL is not within the list of allowable TLDs, the browser program determines whether the requested URL is listed in the database 14 containing a list of acceptable URLs (Step S52). If the requested URL is listed in the database 14 of acceptable URLs, the browser program permits the user 18 to access the requested URL on the public or semi-public computer 4 which he is using (Step S48). If the requested URL is not found in the database 14, then the browser program determines whether the requested URL is listed in the temporary database 20 of acceptable URLs (Step S54). If the requested URL is found in the temporary database 20, then the browser program permits the user to access the requested URL on the computer 4 (Step S48). If the requested URL is not listed in the temporary database 20, then the browser denies access to the requested URL using the public or semi-public computer 4, and causes the computer 4 to display a "request denied" or comparable message on the display 27 (Step S56). In FIG. 2, user "B" 18 may be a student and the public or semi-public computer 4 may be a classroom or library computer, for example.

FIG. 3 further illustrates the operation of the web browser system and method of the present invention. The user "B" 18, when using the public or semi-public computer 4, can access only allowed top level domains (TLDs) or URLs (Step S60). The user 18, on the public or semi-public computer 4, may also access his favorite URL list 68, for example, to add a link to his favorite list (Step S62). He does this by logging in, (Step S64), to a particular remote website 66 where the list 68 may be found, such as the edubrowser.net website 15, and may view his favorite list 68 on the public or semi-public computer 4. If the user 18 requests a non-allowed URL (Step S70) on the public or semi-public computer 4, the computer 4 will not allow the user to access this URL and will display an appropriate message, such as "URL not available" or the like (Step S72).

However, the same user "B" 18, from a home computer 22, can access all URLs, assuming that the browser program of the present invention has not been installed on the home computer 22. Also, from his home computer 22, he can access the remote website 66 where his favorite list 68 is stored, such as by accessing the edubrowser.net website 15 (Step S74), using the same or similar procedure on the remote website 66, including logging in (Step S64) and accessing the favorite list 68, so that the saved URLs are available and accessible (Step S76) on his home computer 22.

The remote website 66, such as the edubrowser.net website 15, may also include a "published list" 78 of URLs of the user 18 which may be viewable by anyone visiting the remote website 66, such as the edubrowser.net website 15, where the user's favorite list 68, which may be private, and the user's published list 78 of URLs are located.

The system and method of the present invention provide a convenient way to allow access to servers of acceptable domains and acceptable URLs by a computer in a public or semi-public environment, such as a library or classroom. The system and method of the present invention is simple to use and install, and further allows lists of favorite URLs or URLs of current interest to be stored at a remote location either on a permanent basis or a temporary basis.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A system for selectively allowing and restricting access to websites requested by a user, each of the requested websites having a uniform resource locator (URL) and a top level domain (TLD) associated therewith, the system comprising:

a computer, the computer having a central processing unit, a display operatively coupled to the central processing unit for displaying messages, and a keyboard operatively coupled to the central processing unit for the user to enter the URL and TLD of a requested website;

a web browser installed on the central processing unit of the computer, the web browser having a list of allowable TLDs, and the central processing unit including a first database having a first list of allowable URLs; and a temporary second database, the temporary second database being situated at one of the central processing unit of the computer and a remote website, the temporary second database having a second list of allowable URLs, the web browser comparing the TLD associated with the requested website with the list of allowable TLDs, and if the TLD associated with the requested website is the same as one of the allowable TLDs of the list of allowable TLDs, then the web browser allows the user to access the requested website on the computer, and if the TLD associated with the requested website is not the same as one of the allowable TLDs of the list of allowable TLDs, then the web browser compares the URL associated with the requested website with the first list of allowable URLs, and if the URL associated with the requested website is the same as one of the allowable URLs of the first list of allowable URLs, then the web browser allows the user to access the requested website on the computer, and if the TLD associated with the requested website is not the same as one of the allowable TLDs of the list of allowable TLDs, and if the URL associated with the requested website is not the same as one of the allowable URLs of the first list of allowable URLs, then the web browser compares the URL associated with the requested website with the second list of allowable URLs of the temporary second database, and if the URL associated with the requested website is one of the allowable URLs of the second list of allowable URLs, then the web browser allows the user to access the requested website on the computer, and if the URL associated with the requested website is not the same as one of the allowable URLs of the second list of allowable URLs, then the web browser causes the central processing unit of the computer to display a message on the display of the computer advising the user of the computer that access to the requested web site on the computer is not allowed.

2. A system for selectively allowing and restricting access to websites requested by a user as defined by claim 1, wherein the temporary second database is situated at the remote website having a URL associated therewith; and wherein the web browser compares the URL associated with the requested website with the URL associated with the remote website at which the temporary second database is situated, and if the URL associated with the requested website is the same as the URL associated with the remote website at which the temporary second database is situated, the web browser allows the user to access the requested website on the computer.

3. A system for selectively allowing and restricting access to websites requested by a user as defined by claim 1, which further comprises:

a third database, the third database being situated at a remote website, the web browser allowing the user of the computer access to the remote website at which the third database is situated, the third database having a list of websites of the user, each of the websites in the user's list of websites having a TLD and URL associated therewith, the TLD and URL associated with the website requested by the user to be accessed on the computer being the same as the TLD and URL of one of the websites of the list of websites of the third database.

4. A system for selectively allowing and restricting access to websites requested by a user as defined by claim 3, wherein the third database includes a first, non-published list of websites and a second, publicly viewable list of websites.

5. A method for selectively allowing and restricting access to websites requested by a user on a computer, each of the requested websites having a uniform resource locator (URL) and a top level domain (TLD) associated therewith, the computer having a central processing unit, a display operatively coupled to the central processing unit for displaying messages, and a keyboard operatively coupled to the central processing unit for the user to enter the URL and TLD of a requested website, the method comprising the steps of:

entering by the user on the keyboard of the computer the URL and TLD of a requested website;

comparing by a web browser installed on the central processing unit of the computer the TLD associated with the requested website with a list of allowable TLDs of the web browser;

if the TLD associated with the requested website is the same as one of the allowable TLDs of the list of allowable TLDs of the web browser, then allowing by the web browser the user to access the requested website on the computer;

if the TLD associated with the requested website is not the same as one of the allowable TLDs of the list of allowable TLDs, then comparing by the web browser the URL associated with the requested website with a first list of allowable URLs of a first database situated at the central processing unit;

if the URL associated with the requested website is the same as one of the allowable URLs of the first list of allowable URLs, then allowing by the web browser the user to access the requested website on the computer;

if the TLD associated with the requested website is not the same as one of the allowable TLDs of the list of allowable TLDs, and if the URL associated with the requested website is not the same as one of the allowable URLs of the first list of allowable URLs, then comparing by the web browser the URL associated with the requested website with a second list of allowable URLs of a temporary second database situated at one of the central processing unit of the computer and a remote website;

if the URL associated with the requested website is the same as one of the allowable URLs of the second list of allowable URLs, then allowing by the web browser the user to access the requested website on the computer; and if the URL associated with the requested website is not the same as one of the allowable URLs on the second list of allowable URLs, then causing by the web browser the central processing unit of the computer to display a message on the display of the computer advising the user of the computer that access to the requested website on the computer is not allowed.

6. A method for selectively allowing and restricting access to websites requested by a user on a computer as defined by claim 5 which further comprises the steps of:

situating a third database at a remote website, the third database having a list of websites of the user, each of the websites in the user's list of websites having a TLD and URL associated therewith, the requested website having an associated TLD and URL which is respectively the same as the TLD and URL associated with one of the websites in the user's list of websites;

allowing by the web browser the requested website to be accessed on the computer by the user if at least one of the TLD and the URL of the requested website is the same as respectively one of the allowable TLDs of the list of allowable TLDs and the same as one of the URLs of the first list of URLs; and if neither one of the TLD and URL associated with the requested website is respectively the same as one of the allowable TLDs of the list of allowable TLDs and one of the URLs of the first list of allowable URLs, then causing by the web browser the central processing unit of the computer to display a message on the display of the computer advising the user of the computer that access to the requested website on the computer is not allowed.

\* \* \* \* \*